US012440761B2

(12) United States Patent
Qiao et al.

(10) Patent No.: US 12,440,761 B2
(45) Date of Patent: Oct. 14, 2025

(54) METHOD AND DEVICE FOR TRIGGERING TELEPORTING OPERATION

(71) Applicant: NETEASE (HANGZHOU) NETWORK CO., LTD., Zhejiang (CN)

(72) Inventors: Shuai Qiao, Zhejiang (CN); Peng Wang, Zhejiang (CN); Shouwei Lin, Zhejiang (CN)

(73) Assignee: NETEASE (HANGZHOU) NETWORK CO., LTD., Zhejiang (CN)

( * ) Notice: Subject to any disclaimer, the term of this patent is extended or adjusted under 35 U.S.C. 154(b) by 78 days.

(21) Appl. No.: 18/043,342

(22) PCT Filed: Nov. 2, 2021

(86) PCT No.: PCT/CN2021/128267
§ 371 (c)(1),
(2) Date: Feb. 28, 2023

(87) PCT Pub. No.: WO2022/222415
PCT Pub. Date: Oct. 27, 2022

(65) Prior Publication Data

US 2024/0017173 A1 Jan. 18, 2024

(30) Foreign Application Priority Data

Apr. 22, 2021 (CN) ......................... 202110439126.9

(51) Int. Cl.
*A63F 13/56* (2014.01)
*A63F 13/49* (2014.01)
(Continued)

(52) U.S. Cl.
CPC .............. *A63F 13/56* (2014.09); *A63F 13/49* (2014.09); *A63F 13/58* (2014.09); *A63F 13/69* (2014.09);
(Continued)

(58) Field of Classification Search
CPC .......... A63F 13/30; A63F 13/35; A63F 13/49; A63F 13/533; A63F 13/537; A63F 13/55;
(Continued)

(56) References Cited

U.S. PATENT DOCUMENTS 10,335,687 B2 * 7/2019 Snow ...................... A63F 13/61
11,504,620 B2 * 11/2022 Li ........................... A63F 13/57
(Continued)

FOREIGN PATENT DOCUMENTS

CN 110368691 A 10/2019
CN 110898432 A 3/2020
(Continued)

OTHER PUBLICATIONS

Notice of Reasons for Rejection dated Aug. 29, 2023 of Japanese Application No. 2022-543736.
(Continued)

*Primary Examiner* — William H McCulloch, Jr.
(74) *Attorney, Agent, or Firm* — Qinghong Xu

(57) ABSTRACT

Provided in the present disclosure is a message sending method, including: providing at least one virtual surveillance character in a preset game scene; determining that a first virtual character is located in a preset range of the virtual surveillance character in the preset game scene and generating a message notification command; and sending the message notification command to a server, such that the server generates a support notification on the basis of the message notification command, the support notification being used for providing a transfer interface to at least one
(Continued)

second client terminal controlling a second virtual character, and the transfer interface being used for triggering a command for transferring the second virtual character to the preset game scene in which the first virtual character is located.

14 Claims, 11 Drawing Sheets

(51) Int. Cl.
*A63F 13/58* (2014.01)
*A63F 13/69* (2014.01)
*A63F 13/75* (2014.01)
*A63F 13/822* (2014.01)

(52) U.S. Cl.
CPC ............ *A63F 13/75* (2014.09); *A63F 13/822* (2014.09); *A63F 2300/638* (2013.01)

(58) Field of Classification Search
CPC .......... A63F 13/56; A63F 13/58; A63F 13/69; A63F 13/75; A63F 13/822; A63F 13/87; A63F 2300/638
See application file for complete search history.

(56) References Cited

U.S. PATENT DOCUMENTS

| | | | | |
|---|---|---|---|---|
| 11,865,449 | B2 * | 1/2024 | Wei | A63F 13/426 |
| 11,935,195 | B1 * | 3/2024 | Futryk | A63F 13/65 |
| 12,132,775 | B2 * | 10/2024 | Ahn | H04M 3/563 |
| 12,165,263 | B1 * | 12/2024 | Futryk | G06F 3/011 |
| 2003/0040347 | A1 * | 2/2003 | Roach | A63F 13/30 463/9 |
| 2004/0143852 | A1 * | 7/2004 | Meyers | A63F 13/822 463/43 |
| 2004/0157662 | A1 * | 8/2004 | Tsuchiya | A63F 13/5378 463/32 |
| 2009/0046094 | A1 * | 2/2009 | Hamilton, II | G06F 3/04815 715/777 |
| 2009/0241036 | A1 * | 9/2009 | Reisinger | A63F 13/12 715/757 |
| 2010/0081508 | A1 * | 4/2010 | Bhogal | A63F 13/75 463/40 |
| 2017/0232342 | A1 | 8/2017 | Morel et al. | |
| 2017/0291108 | A1 * | 10/2017 | Kim | A63F 13/525 |
| 2017/0340959 | A1 * | 11/2017 | Tang | G06F 3/0488 |
| 2018/0161678 | A1 * | 6/2018 | Snow | A63F 13/822 |
| 2022/0080316 | A1 * | 3/2022 | Huang | A63F 13/5378 |
| 2023/0214007 | A1 * | 7/2023 | Dabush | G02B 27/0093 345/156 |
| 2024/0017173 | A1 * | 1/2024 | Qiao | A63F 13/35 |
| 2024/0293747 | A1 * | 9/2024 | Zhu | A63F 13/55 |
| 2024/0299848 | A1 * | 9/2024 | Xu | A63F 13/537 |
| 2024/0350922 | A1 * | 10/2024 | Li | A63F 13/58 |
| 2024/0382851 | A1 * | 11/2024 | Zhang | A63F 13/2145 |

FOREIGN PATENT DOCUMENTS

| | | | |
|---|---|---|---|
| CN | 111111194 | A | 5/2020 |
| CN | 111760268 | A | 10/2020 |
| CN | 112090069 | A | 12/2020 |
| CN | 112604302 | A | 4/2021 |
| CN | 112619150 | A | 4/2021 |
| CN | 113144608 | A | 7/2021 |
| KR | 20150047142 | A | 5/2015 |

OTHER PUBLICATIONS

Metal Gear Solid V the Phantom Pain Official Complete Guide, p. 31-33, ISBN978-4-04-733078-8, Published on Nov. 13, 2015.
International Search Report dated Jan. 28, 2022 of International Application No. PCT/CN2021/128267.
Notice of Allowance dated Dec. 15, 2023 for Chinese Application No. 202110439126.9.

* cited by examiner

METHOD AND DEVICE FOR TRIGGERING TELEPORTING OPERATION

CROSS-REFERENCE

The present application is the 371 application of PCT Application No. PCT/CN2021/128267, filed on Nov. 2, 2021, which is based upon and claims the priority to the Chinese Patent Application NO. 202110439126.9, entitled "MESSAGE SENDING METHOD AND APPARATUS, DEVICE, AND STORAGE MEDIUM", filed on Apr. 22, 2021, the entire contents of which are hereby incorporated by reference.

TECHNICAL FIELD

The present disclosure relates to the field of game technologies, and in particular, to a method and apparatus for sending a message, a device and a storage medium.

BACKGROUND

With the continuous development of the game industry, various types of games have appeared on the market at present, such as tactical competitive games, shooting games, card games, leisure games, role-playing games or the like, where the ones with the most complex implementation and richest content are Massive Multiplayer Online Role-Playing Games (MMORPGs), which involve various scenes, such as big map scenes, gang scenes, PVE instance scenes, etc. Each type of scenes has its own unique functionality, that is, each type of scenes corresponds to different gameplay.

There may be many instances in team battle games of the MMORPG games, and players get rewards by completing instance tasks. In some instances, each gang will have a corresponding Non-player Character (NPC) to guard a current instance, and if another gang wants to get the reward corresponding to this instance, this gang needs to have a battle against the NPC, and can only get the reward after winning the battle. In the prior art, it is generally required that a player from the other gang approaches or activates the NPC to immediately trigger a battle mode.

SUMMARY

In a first aspect, an embodiment of the present disclosure provides a method for sending a message, applied to a first client, wherein the first client is a client corresponding to a first virtual character, a graphical user interface is provided by the client, and at least part of a preset game scene is displayed by the graphical user interface, and the method includes:

providing at least one virtual surveillance character in the preset game scene;

determining that the first virtual character is located within a preset range of the virtual surveillance character in the preset game scene, and generating a message notification instruction, wherein the first virtual character is a virtual character of a first game faction; and sending the message notification instruction to a server, so that a support notification is generated by the server according to the message notification instruction, the support notification is used to provide a teleporting interface to at least one second client that controls a second virtual character, and the teleporting interface is used to trigger an instruction for teleporting the second virtual character to the preset game scene where the first virtual character is located.

In a second aspect, another embodiment of the present disclosure provides a method for sending a message, applied to a server, and the method includes:

providing at least one virtual surveillance character in a preset game scene; and determining that a first virtual character is located within a preset range of the virtual surveillance character in the preset game scene, and sending a support notification to at least one second client of a second virtual character of a second game faction, wherein the first virtual character is a virtual character of a first game faction, the support notification is used to provide a teleporting interface to the at least one second client that controls the second virtual character, and the teleporting interface is used to trigger an instruction for teleporting the second virtual character to the preset game scene where the first virtual character is located.

In a third aspect, another embodiment of the present disclosure provides an apparatus for sending a message, wherein the first client is a client corresponding to a first virtual character, a graphical user interface is provided by the client, and at least part of a preset game scene is displayed by the graphical user interface, and the apparatus includes: a providing module, a determining module and a sending module, wherein:

the providing module is configured to provide at least one virtual surveillance character in the preset game scene;

the determining module is configured to determine that the first virtual character is located within a preset range of the virtual surveillance character in the preset game scene, and generate a message notification instruction, wherein the first virtual character is a virtual character of a first game faction; and the sending module is configured to send the message notification instruction to a server, so that a support notification is generated by the server according to the message notification instruction, the support notification is used to provide a teleporting interface to at least one second client that controls a second virtual character, and the teleporting interface is used to trigger an instruction for teleporting the second virtual character to the preset game scene where the first virtual character is located.

In a fourth aspect, another embodiment of the present disclosure provides an apparatus for sending a message, applied to a server, and the apparatus includes: a providing module, a determining module and a sending module, wherein:

the providing module is configured to provide at least one virtual surveillance character in a preset game scene;

the determining module is configured to determine that a first virtual character is located within a preset range of the virtual surveillance character in the preset game scene, and the sending module is configured to send a support notification to at least one second client of a second virtual character of a second game faction, wherein the first virtual character is a virtual character of a first game faction, the support notification is used to provide a teleporting interface to the at least one second client that controls the second virtual character, and the teleporting interface is used to trigger an instruction for teleporting the second virtual character to the preset game scene where the first virtual character is located.

In a fifth aspect, another embodiment of the present disclosure provides a device for sending a message, including: a processor, a storage medium, and a bus, wherein machine-readable instructions executable by the processor are stored in the storage medium, when the device for sending the message is running, the processor is in communication with the storage medium through the bus, and the processor is configured to perform the machine-readable instructions to perform steps of the method according to any one of the first aspect or the second aspect.

In a sixth aspect, another embodiment of the present disclosure provides a storage medium having a computer program stored thereon, which, when run by a processor, performs steps of the method according to any one of the first aspect or the second aspect.

BRIEF DESCRIPTION OF THE DRAWINGS

In order to illustrate the technical solutions of embodiments of the present disclosure more clearly, the drawings used in the embodiments of the present disclosure are briefly introduced below. It should be understood that the following drawings only show some embodiments of the present disclosure, and therefore should not be regarded as a limitation on the scope. For those of ordinary skill in the art, other related drawings may also be obtained based on these drawings without creative work.

DETAILED DESCRIPTION

Figure 1:
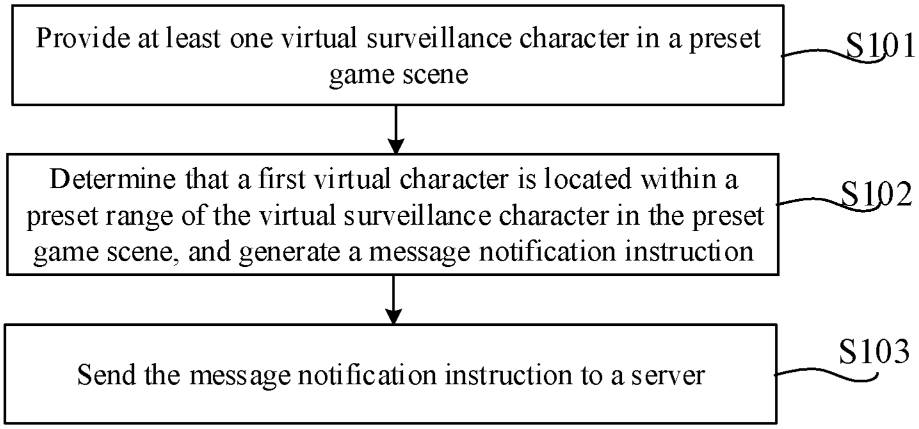
FIG. 1 is a schematic flowchart of a method for sending a message provided by an embodiment of the present disclosure.

In order to make objectives, technical solutions and advantages of embodiments of the present disclosure clearer, the technical solutions in the embodiments of the present disclosure will be clearly and completely described below with reference to the drawings in the embodiments of the present disclosure. Obviously, the described embodiments are some but not all embodiments of the present disclosure.

Components of the embodiments of the present disclosure, which are generally described and illustrated in the drawings herein, may be arranged and designed in a variety of different configurations. Therefore, the following detailed description of the embodiments of the present disclosure provided in the drawings is not intended to limit the claimed scope of the present disclosure, but is merely representative of selected embodiments of the present disclosure. Based on the embodiments of the present disclosure, all other embodiments obtained by those skilled in the art without involving creative work are within the scope of protection of the present disclosure.

In addition, flowcharts used in the present disclosure illustrate operations implemented in accordance with some embodiments of the present disclosure. It should be understood that the operations of the flowcharts may be implemented out of order and that steps without logical context may be implemented in a reverse order or concurrently. In addition, under the guidance of content of the present disclosure, those skilled in the art can add one or more other operations to the flowcharts, or remove one or more operations from the flowcharts.

In addition, the singular forms "a", "an", "the" and "said" are intended to include the plural forms as well, unless the context clearly indicates otherwise.

A method for sending a message provided by the embodiments of the present disclosure is explained below with reference to a plurality of specific application examples. FIG. 1 is a schematic flowchart of a method for sending a message provided by an embodiment of the present disclosure, and the method is applied to a first client, the first client is a client corresponding to a first virtual character, a graphical user interface is provided by the client, and at least part of a preset game scene is displayed by the graphical user interface. As shown in FIG. 1, the method includes S101 to S103.

In the S101, at least one virtual surveillance character is provided in the preset game scene.

In some possible embodiments, the virtual surveillance character may be located in a preset game instance scene, such as a scene corresponding to a gang instance task between game factions, or may be located in a preset game non-instance scene. For example, taking an instance scene as a treasure house as an example for illustration, the virtual surveillance character can be, for example, set in a treasure house instance, and used to guard a treasure box in the treasure house instance; and the virtual surveillance character can also be, for example, set outside the treasure house instance, and used to guard an entrance of the treasure house instance. It should be understood that the foregoing embodiments are only exemplary descriptions, and a specific setting position of the virtual surveillance character and a specific type of the instance scene can be flexibly adjusted according to user needs, and are not limited to what is given in the above embodiments.

In some possible embodiments, the at least one virtual surveillance character may be at least one virtual surveillance character provided in the preset game scene according to a preset setting rule, which may be, for example, a Non-player Character (NPC) preset by a system. When presetting the NPC, the system can, for example, set different NPCs according to different preset game scenes. For example, the NPC can be set according to the difficulty of the preset game scene. Still taking the treasure house instance as an example for illustration, for some higher-level treasure house instances, higher-level NPCs can be set, and the higher the level of the NPC, the wider a preset range corresponding to the NPC, or the more difficult to defeat the NPC. For some lower-level treasure house instances, lower-level NPCs can be set accordingly. Alternatively, the NPC can also be set according to a level of a second game faction, for example, the higher the level of the second game faction, the higher the set NPC level is, which can be adjusted according to user needs, which are not limited to what is given in the above embodiments.

In some other possible embodiments, the at least one virtual surveillance character may also be a target virtual surveillance character displayed based on a preset operation of the second game faction, which may be, for example, a NPC purchased by the second game faction in a virtual prop purchase mall and placed in the preset game scene. The virtual prop purchase mall can provide a variety of different types of NPCs, different NPCs can correspond to different purchase prices, and the second game faction can purchase a corresponding NPC based on the current faction budget and a required specific type. Alternatively, the virtual surveillance character can also be a target second virtual character determined by the second game faction among at least one second virtual character, and a doppelganger of the target second virtual character is placed in the preset game scene. For example, a doppelganger of a gang leader of the second game faction can be determined as the virtual surveillance character, and the doppelganger of the gang leader of the second game faction can be placed in the preset game scene. It should be understood that the above embodiments are only exemplary descriptions, and how to specifically set the virtual surveillance character can be flexibly adjusted according to user needs, and is not limited to what is given in the above embodiments.

In the S102, it is determined that the first virtual character is located within a preset range of the virtual surveillance character in the preset game scene, and a message notification instruction is generated.

In an embodiment of the present disclosure, a manner for determining whether the first virtual character is within the preset range of the virtual surveillance character may be, for example, controlling the first virtual character to move in the preset game scene in response to a movement operation on the first virtual character; acquiring a position of the first virtual character in the preset game scene during movement of the first virtual character; and determining that the first virtual character is located within the preset range of the virtual surveillance character in the preset game scene according to the position.

In some possible embodiments, the preset range of the virtual surveillance character is a preset range with the virtual surveillance character as a center and a line-of-sight distance of the virtual surveillance character as a radius.

In some other possible embodiments, the preset range of the virtual surveillance character is a preset range determined with the virtual surveillance character as the center and the line-of-sight distance of the virtual surveillance character as the radius. For example, the preset range may also be related to an orientation of the virtual surveillance character. Centered on a preset object, a preset area with the radius of the line-of-sight distance of the virtual surveillance character within a range of 120 degrees corresponding to the orientation of the virtual surveillance character is determined as the preset range. It should be understood that the above embodiments are only exemplary descriptions, and how to specifically determine the preset range according to the orientation, and a specific angle corresponding to the orientation can be flexibly adjusted according to user needs, and are not limited to what is given in the above embodiments.

In some other possible embodiments, a game interface includes an in-view scene image and an out-of-view scene image located outside a visual range, which are determined according to the visual range of the virtual surveillance character, and the preset range is a range determined according to the in-view scene image.

In an embodiment of the present disclosure, before the position information is acquired, the first virtual character may be controlled to move within the preset game scene in response to the movement operation on the first virtual character. Optionally, for the acquired position information, a coordinate system of the game scene may be used to acquire coordinate information as the position information.

In the S103, the message notification instruction is sent to a server.

The message notification instruction enables the server to generate a support notification according to the message notification instruction, the support notification is used to provide a teleporting interface to at least one second client that controls the second virtual character, and the teleporting interface is used to trigger an instruction for teleporting the second virtual character to the preset game scene where the first virtual character is located.

In an embodiment of the present disclosure, there may be an upper limit on the number of second virtual characters to be teleported. For example, up to four second virtual characters may be teleported to the preset game scene, and during the teleporting, according to a response speed of the second virtual character, top four second virtual characters in terms of response speed are determine as target second virtual characters, and the four target second virtual characters are teleported to the preset game scene. If the determination of the target second virtual character has been completed, that is, the number of teleported second virtual characters has reached the upper limit, for a second virtual character who responds later, the server will feed back prompt information that indicates that the number of current supporters has reached the upper limit, and please support in time next time.

In some other possible embodiments, for some preset game scenes, there may be a certain requirement for the second virtual character which is to be teleported, for example, a time for the second virtual character to join the second game faction needs to exceed a preset time threshold, or a level of the second virtual character needs to be greater than a level threshold of the current preset game scene, etc. For a second virtual character that initiates a response but does not satisfy the requirement, the server will feed back prompt information that indicates that the current second virtual character does not satisfy the preset requirement, and the server may feed back a specific content that does not satisfy the preset requirement. For example, if the level threshold of the current preset game scene is level 15, and the level of the second virtual character that initiates the response is level 13, the server can feed back the prompt information "the current support requires players with levels above level 15, and your level does not satisfy the requirement". A specific requirement for the second virtual character to be teleported can be flexibly adjusted according to user needs, and is not limited to what is given in the above embodiments.

By adopting the method for sending the message provided by the present disclosure, when the position information of the first virtual character is within the preset range of the virtual surveillance character, the at least one second virtual character of the second game faction can be automatically notified to be teleported to the preset game scene, such setting manner enriches the game manner, a player can control the position information of the first virtual character to be outside a view range of the virtual surveillance character avoiding the virtual surveillance character, or the player can control the first virtual character to have a battle against the second virtual character teleported to the preset game scene. Through the surveillance of the virtual surveillance character, a game experience of the player is improved.

Figure 2:
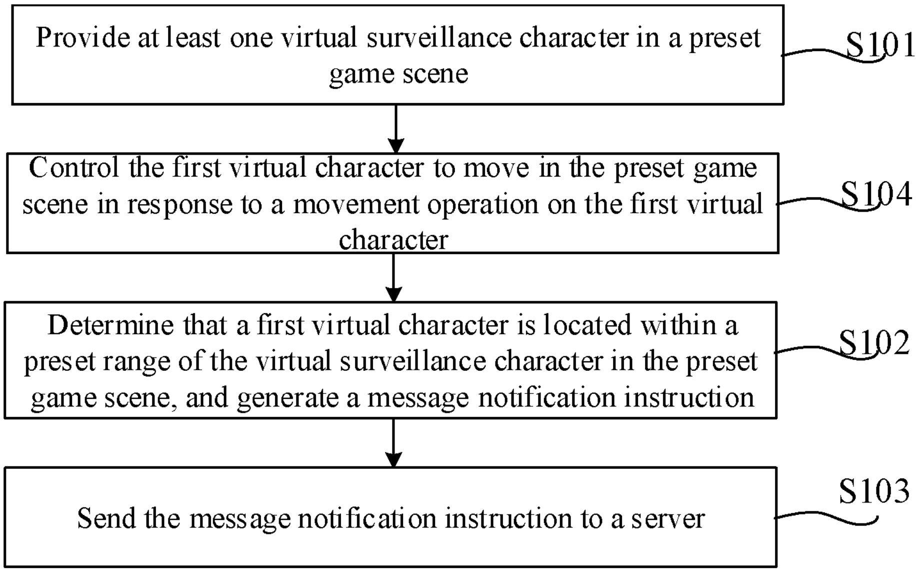
FIG. 2 is a schematic flowchart of a method for sending a message provided by another embodiment of the present disclosure.

Optionally, on the basis of the foregoing embodiments, an embodiment of the present disclosure may further provide a method for sending a message, and an implementation process of the method is exemplified below with reference to the drawings. FIG. 2 is a schematic flowchart of a method for sending a message provided by another embodiment of the present disclosure, and as shown in FIG. 2, before the S102, the method further includes:

in S104, in response to a movement operation on the first virtual character, the first virtual character is controlled to move within the preset game scene.

The movement operation of the first virtual character may be, for example, an operation of the player on a movement control in the graphical user interface, or a movement operation of the player on an external device connected to the client, or a movement operation triggered by a sliding or clicking operation of the player on the graphical user interface. It should be understood that the above embodiments are only exemplary descriptions, and a specific trigger manner for the movement operation can be flexibly adjusted according to user needs, and is not limited to what is given in the above embodiments.

Figure 3:
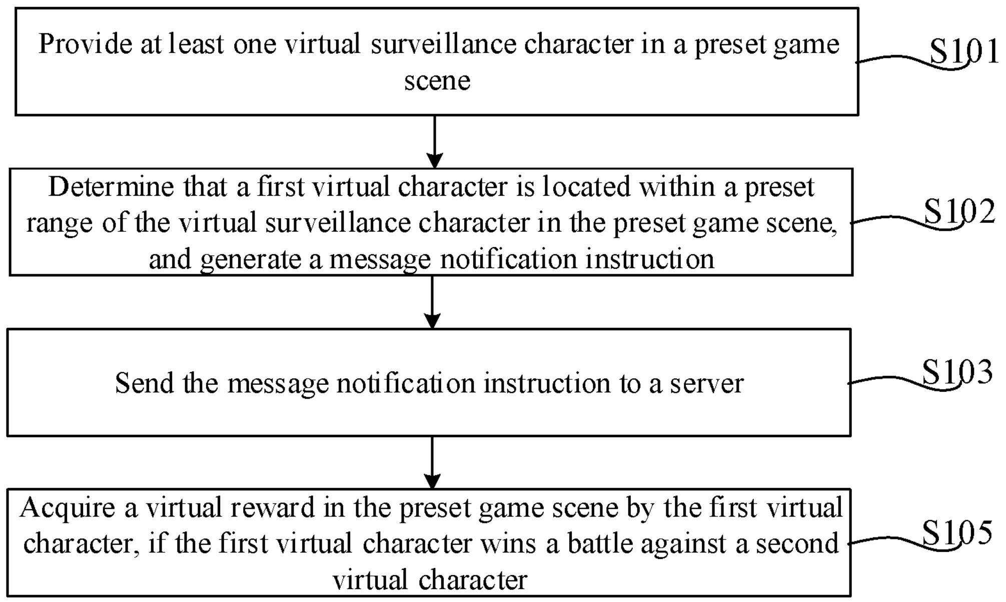
FIG. 3 is a schematic flowchart of a method for sending a message provided by another embodiment of the present disclosure.

Optionally, on the basis of the foregoing embodiments, an embodiment of the present disclosure may further provide a method for sending a message, and an implementation process of the method is exemplified below with reference to the drawings. FIG. 3 is a schematic flowchart of a method for sending a message provided by another embodiment of the present disclosure, and as shown in FIG. 3, after the S103, the method may further include:

in S105, if the first virtual character wins a battle against the second virtual character, the first virtual character acquires a virtual reward in the preset game scene.

Still taking a treasure box instance as an example for illustration, if the first virtual character wins the battle, the first virtual character can earn the virtual reward corresponding to the current treasure box instance, and the higher the level of the treasure box instance, the more virtual rewards the first virtual character earns. Please note that, there may be other rewards, such as a virtual currency, a prop, etc., which are not limited here.

In some possible embodiments, the first virtual character may perform a task in a team formed by a plurality of first virtual characters in a plurality of first game factions, but the maximum number of team members of the first game faction corresponds to the upper limit of the number of second virtual characters in the second game faction that can be teleported. That is, if the upper limit of the number of second virtual characters in the second game faction that can be teleported is four, the maximum number of members forming the team to perform the task in the first game faction is also four. Whether the first game faction can form a team to perform the task and a specific restriction on forming the team can be flexibly adjusted according to user needs, and are not limited to what is given in the above embodiments.

Figure 4:
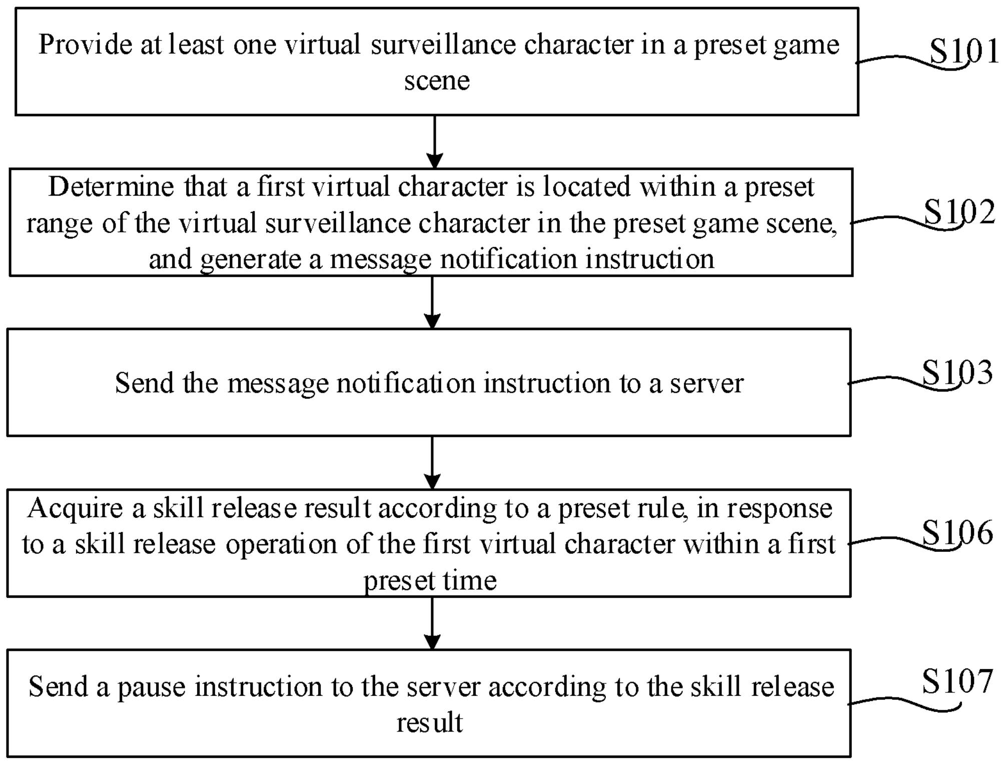
FIG. 4 is a schematic flowchart of a method for sending a message provided by another embodiment of the present disclosure.

Optionally, on the basis of the foregoing embodiments, an embodiment of the present disclosure may further provide a method for sending a message, and an implementation process of the method is exemplified below with reference to the drawings. FIG. 4 is a schematic flowchart of a method for sending a message provided by another embodiment of the present disclosure, and as shown in FIG. 4, after the S103, the method may further include S106 and S107.

In the S106, in response to a skill release operation of the first virtual character within a first preset time, a skill release result is acquired according to a preset rule.

The first preset time is a duration required for transmission of the support notification, that is, the transmission of the support notification needs loading, and the loading means a progress of the transmission of the support notification, that is, the time required for the transmission of the support notification. During the loading of the transmission of the support notification, the first virtual character can interrupt the transmission of the support notification by releasing the skill. During the transmission of the support notification, the first virtual character and the virtual surveillance character immediately enter a battle state, and in the battle state, the first virtual character can release the skill.

In an embodiment of the present disclosure, the skill release operation may include, for example, a plurality of skills, which, for example, include a stun skill and a strike skill. After the stun skill is released, the virtual surveillance character can be stunned, but the stun skill may have a certain probability of success, that is, not every release of the stun skill can be successful, so after the skill is released, it is necessary to acquire the skill release result according to a preset success probability. After the strike skill is released, a hit point of the virtual surveillance character can be reduced, and when the hit point of the virtual surveillance character is reduced to 0, it indicates that the current strike skill release operation has defeated the virtual surveillance character.

For example, in addition to having a certain probability of success, the stun skill operation can also have a cooling time. For example, the use of the stun skill needs to be separated by two rounds, and the strike skill can have no cooling time, and can be used every round. A reduction value of the hit point of the virtual character caused by the strike skill can be related to, for example, the level of the first virtual character, equipment the first virtual character wears, or other bonuses, and there is a certain probability that a critical strike skill will be triggered when the strike skill is released. A reduction value of the hit point of the virtual character caused by the critical strike skill is greater than the reduction value of the hit point of the virtual character caused by the strike skill.

In some possible embodiments, the probability of success may be, for example, a random probability, that is, the current skill release result is determined randomly according to the random probability, and will not be affected by the level or equipment of the first virtual character.

In some other possible embodiments, release information of the skill may be acquired in response to the skill release operation of the first virtual character within the first preset time, and the release information includes at least one of the following: a skill attribute, a release direction, and a release distance; and the skill release result is acquired according to the release information and the preset rule, that is, the skill release result can be associated with the release information of the skill. The skill attribute may be, for example, related to the level of the first virtual character, or may be related to the equipment of first virtual character. The higher the level of the first virtual character or the higher the level of the equipment of the first virtual character, the higher the corresponding skill attribute. For example, the higher the skill attribute, the higher the corresponding probability of success, or the shorter the distance between a release distance of the skill and the virtual surveillance character, the higher the corresponding probability of success. A specific content included in the release information and a specific relationship between the release information and the skill release result can be flexibly adjusted according to user needs, and are not limited to what is given in the above embodiments.

In the S107, a pause instruction is sent to the server according to the skill release result.

When the stun skill successfully stuns the virtual surveillance character, or the strike skill defeats the virtual surveillance character, it is determined that the skill release result is that the release is successful, and in this case, the pause instruction is sent to the server, the pause instruction is used to pause the sending of the support notification.

If the hit point of the first virtual character is already 0 before the virtual surveillance character is successfully stunned or defeated, it is determined that the first virtual character has failed in this battle, and the first virtual character can choose to fight again, or perform upgrading or fight again after upgrading the equipment or the skill.

In some possible embodiments, an instance corresponding to the virtual surveillance character includes a plurality of sub-instances, and after the first virtual character acquires the virtual reward in the preset game scene, the first virtual character can also be controlled to enter a scene of a next-level sub-instance of a current sub-instance according to parent-child relationships between individual sub-instances.

Still taking the treasure box instance scene as an example for illustration, for the treasure box instance scene, four treasure box instance levels may be included, and when the first virtual character first enters the treasure box instance scene, it enters a first treasure box instance level, and the first virtual character will enter a second treasure box instance level only after successfully getting a virtual reward corresponding to the first treasure box instance level in the first treasure box instance level, until the first virtual character successfully gets a virtual reward corresponding to a fourth treasure box instance level in the fourth treasure box instance level, it is determined that the first virtual character completes a treasure box instance task. In some possible embodiments, the difficulty of different sub-instances may be different. For example, the mission completion difficulty of the first treasure box instance level may be the lowest, and as the treasure box instance level becomes high, the corresponding mission completion difficulty gradually increases, and the fourth treasure box instance level is a level with the largest mission completion difficulty in the current treasure box instance scene. A specific setting of the instance scene level and whether there is a difficulty difference between respective levels can be flexibly adjusted according to user needs, and are not limited to what is given in the above embodiments.

In an embodiment of the present disclosure, if it is determined that the position of the first virtual character is within the preset range of the virtual surveillance character after a second preset time interval, the message notification instruction is generated, and the message notification instruction is sent to the server. That is, after the second preset time interval, the virtual surveillance character will resume, and if the position of the first virtual character is still within the preset range after the resume of the virtual surveillance character, a notification message will stilled be sent to notify the at least one second virtual character of the second game faction.

By adopting the method for sending the message provided by the present disclosure, when the position information of the first virtual character is within the preset range of the virtual surveillance character, the at least one second virtual character of the second game faction can be automatically notified to be teleported to the preset game scene to have a battle against the first virtual character, and the corresponding virtual reward can be acquired only when the first virtual character wins the battle. However, the successful sending of the notification message needs the first preset time, and during the process of notifying the at least one second virtual character of the second game faction, the first virtual character can interrupt the sending of the notification through the skill release operation or a second skill release operation. If the interruption is successful, the sending of the notification is canceled. Such setting manner not only enriches the game manner, but also improves the game experience of the player.

Figure 5:
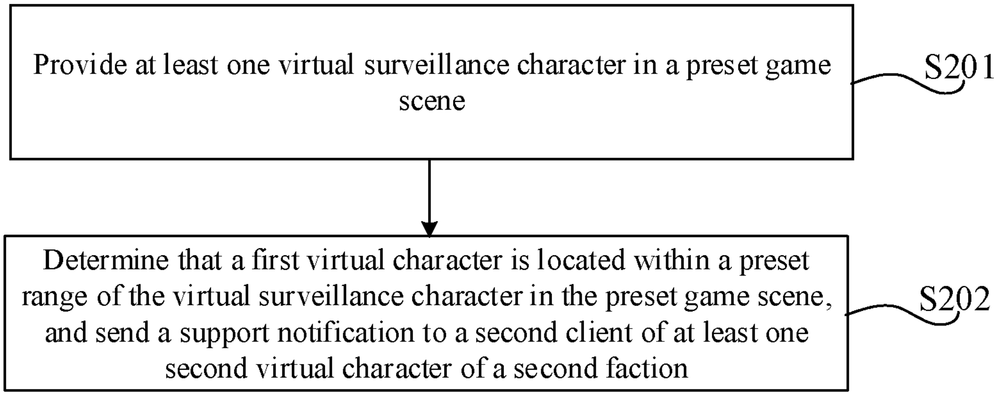
FIG. 5 is a schematic flowchart of a method for sending a message provided by another embodiment of the present disclosure.

Optionally, on the basis of the foregoing embodiments, an embodiment of the present disclosure may further provide a method for sending a message, and an implementation process of the method is exemplified below with reference to the drawings. FIG. 5 is a schematic flowchart of a method for sending a message provided by another embodiment of the present disclosure, and the method is applied to a server. As shown in FIG. 5, the method may include:

- in S201, at least one virtual surveillance character is provided in a preset game scene; and
- in S202, it is determined that a first virtual character is located within a preset range of the virtual surveillance character in the preset game scene, and a support notification is sent to at least one second client of a second virtual character of a second game faction.

The first virtual character is a virtual character of a first game faction, the support notification is used to provide a teleporting interface to at least one second client that controls the second virtual character, and the teleporting interface is used to trigger an instruction for teleporting the second virtual character to the preset game scene where the first virtual character is located.

In some possible embodiments, position information of the first virtual character in the preset game scene can be acquired; and it is determined that the first virtual character is located within the preset range of the virtual surveillance character in the preset game scene according to the position information.

The acquisition of the position information can be, for example, receiving a movement instruction for the first virtual character sent by a first client; determining a target position of the first virtual character in the preset game scene according to the movement instruction, and sending position information corresponding to the target position to the first client corresponding to the first virtual character; and acquiring the position information of the first virtual character after moving according to the target position, in response to receiving a confirmation message sent by the first client.

The above-mentioned embodiments are an opposite-side method of FIG. 1, and therefore the corresponding beneficial effects are the same as those brought by FIG. 1, which will not be repeated in the present disclosure.

Figure 6:
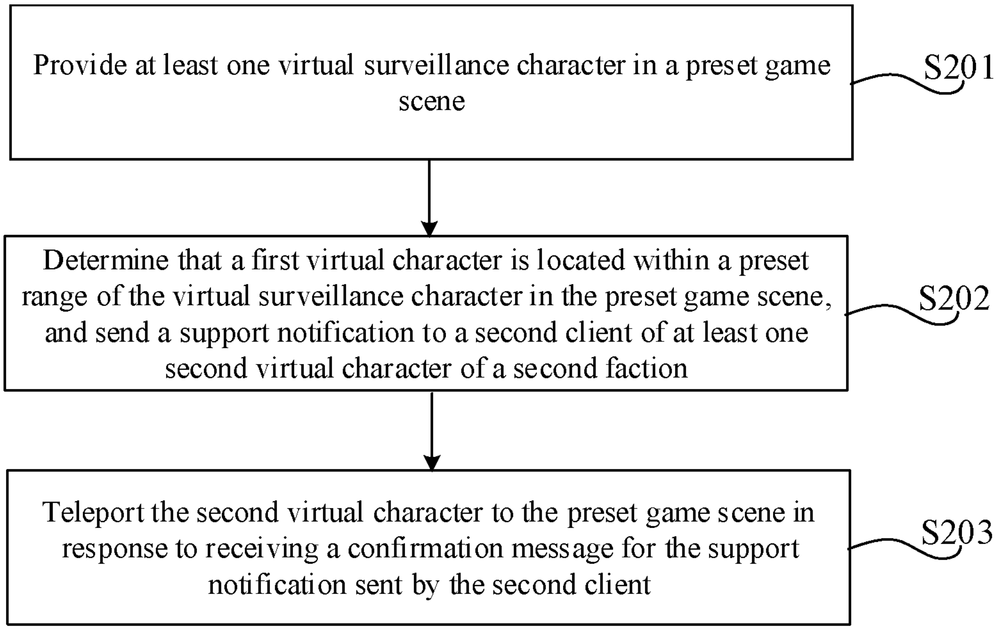
FIG. 6 is a schematic flowchart of a method for sending a message provided by another embodiment of the present disclosure.

Optionally, on the basis of the foregoing embodiments, an embodiment of the present disclosure may further provide a method for sending a message, and an implementation process of acquiring the position information of the first virtual character in the foregoing method is exemplified below with reference to the drawings. FIG. 6 is a schematic flowchart of a method for sending a message provided by another embodiment of the present disclosure, and as shown in FIG. 6, the method may further include:

in S203, in response to receiving a confirmation message for the support notification sent by the second client, the second virtual character is teleported to the preset game scene.

The second virtual character teleported to the preset game scene immediately enters into a battle with the first virtual character in the current preset virtual scene.

The above-mentioned embodiments are an opposite-side method of FIGS. 1 to 4, and therefore the corresponding beneficial effects are the same as those brought by FIGS. 1 to 4, which will not be repeated in the present disclosure.

The following is an explanatory description of an apparatus for sending a message provided by the present disclosure in conjunction with the drawings, and the apparatus can perform any method for sending the message in FIGS. 1 to 4. For its specific implementation and beneficial effects, reference may be made to the above, which are not repeated below.

Figure 7:
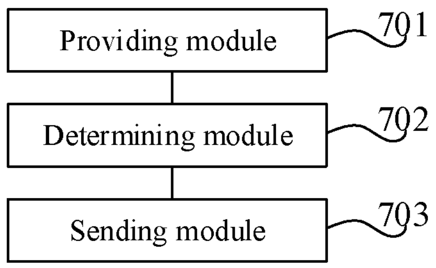
FIG. 7 is a schematic structural diagram of an apparatus for sending a message provided by an embodiment of the present disclosure.

FIG. 7 is a schematic structural diagram of an apparatus for sending a message provided by an embodiment of the present disclosure. As shown in FIG. 7, the apparatus is applied to a first client, the first client is a client corresponding to a first virtual character, a graphical user interface is provided by the client, and at least part of a preset game scene is displayed by the graphical user interface. The apparatus includes: a providing module 701, a determining module 702 and a sending module 703.

The providing module 701 is configured to provide at least one virtual surveillance character in the preset game scene.

The determining module 702 is configured to determine that the first virtual character is located within a preset range of the virtual surveillance character in the preset game scene, and generate a message notification instruction, and the first virtual character is a virtual character of a first game faction.

The sending module 703 is configured to send the message notification instruction to a server, so that a support notification is generated by the server according to the message notification instruction, the support notification is used to provide a teleporting interface to at least one second client that controls a second virtual character, and the teleporting interface is used to trigger an instruction for teleporting the second virtual character to the preset game scene where the first virtual character is located.

Figure 8:
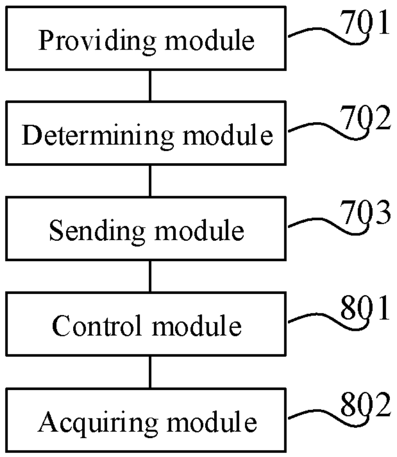
FIG. 8 is a schematic structural diagram of an apparatus for sending a message provided by an embodiment of the present disclosure.

Optionally, on the basis of the foregoing embodiments, an embodiment of the present disclosure may further provide an apparatus for sending a message, and an implementation process of the apparatus provided in FIG. 7 is exemplified below with reference to the drawings. FIG. 8 is a schematic structural diagram of an apparatus for sending a message provided by another embodiment of the present disclosure, and as shown in FIG. 8, the apparatus further includes: a control module 801 and an acquiring module 802.

The control module 801 is configured to control the first virtual character to move in the preset game scene in response to a movement operation on the first virtual character.

The acquiring module 802 is configured to acquire a position of the first virtual character in the preset game scene during movement of the first virtual character.

The determining module 702 is configured to determine that the first virtual character is located within the preset range of the virtual surveillance character in the preset game scene according to the position.

Optionally, the providing module 701 is specifically configured to provide the at least one virtual surveillance character in the preset game scene according to a preset setting rule.

Optionally, the at least one virtual surveillance character is a target virtual surveillance character displayed based on a preset operation of a second game faction.

Optionally, the control module 801 is specifically configured to control the first virtual character to move within the preset game scene in response to a movement operation on the first virtual character.

Optionally, the acquiring module 802 is specifically configured to, if the first virtual character wins a battle against the second virtual character, acquire a virtual reward in the preset game scene.

Optionally, the acquiring module 802 is specifically configured to acquire a corresponding skill release result according to a preset rule, in response to a skill release operation of the first virtual character within a first preset time.

The sending module 703 is specifically configured to send a pause instruction to the server according to the skill release result, and the pause instruction is used to pause sending of the support notification.

Optionally, the acquiring module 802 is specifically configured to acquire release information of the skill in response to the skill release operation of the first virtual character within the first preset time, and the release information includes at least one of the following: a skill attribute, a release direction, and a release distance; and acquire the skill release result according to the release information and the preset rule.

Optionally, the control module 801 is specifically configured to control the first virtual character to enter a scene of a next-level sub-instance of a current sub-instance according to parent-child relationships between individual sub-instances.

Optionally, the first preset time is a duration required for transmission of the support notification.

Optionally, the determining module 702 is specifically configured to generate the message notification instruction, if the position of the first virtual character is within the preset range of the virtual surveillance character after a second preset time interval.

The sending module 703 is specifically configured to send the message notification instruction to the server.

Optionally, the preset range of the virtual surveillance character is a preset range with the virtual surveillance character as a center and a line-of-sight distance of the virtual surveillance character as a radius.

Optionally, the determining module 702 is specifically configured to determine the preset range with the virtual surveillance character as a center and a line-of-sight distance of the virtual surveillance character as a radius.

The following is an explanatory description of an apparatus for sending a message provided by the present disclosure in conjunction with the drawings, and the apparatus can perform any method for sending the message in FIGS. 5 to 6. For its specific implementation and beneficial effects, reference may be made to the above, which are not repeated below.

Figure 9:
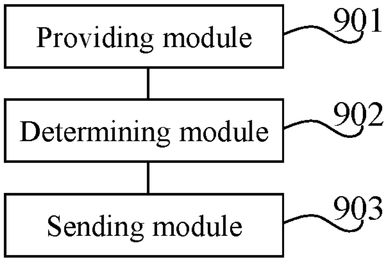
FIG. 9 is a schematic structural diagram of an apparatus for sending a message provided by another embodiment of the present disclosure.

FIG. 9 is an apparatus for sending a message provided by an embodiment of the present disclosure, which is applied to a server, and the apparatus includes: a providing module 901, a determining module 902, and a sending module 903.

The providing module 901 is configured to provide at least one virtual surveillance character in a preset game scene.

The determining module 902 is configured to determine that a first virtual character is located within a preset range of the virtual surveillance character in the preset game scene.

The sending module 903 is configured to send a support notification to at least one second client of a second virtual character of a second game faction, the first virtual character is a virtual character of a first game faction, the support notification is used to provide a teleporting interface to the at least one second client that controls the second virtual character, and the teleporting interface is used to trigger an instruction for teleporting the second virtual character to the preset game scene where the first virtual character is located.

Figure 10:
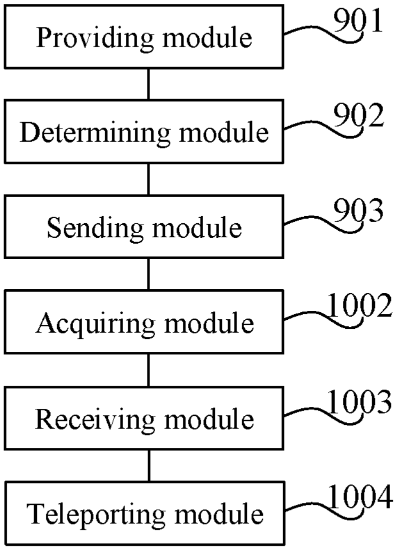
FIG. 10 is a schematic structural diagram of an apparatus for sending a message provided by another embodiment of the present disclosure.

Optionally, on the basis of the foregoing embodiments, an embodiment of the present disclosure may further provide an apparatus for sending a message, and an implementation process of the apparatus provided in FIG. 9 is exemplified below with reference to the drawings. FIG. 10 is a schematic structural diagram of an apparatus for sending a message provided by another embodiment of the present disclosure, and as shown in FIG. 10, the apparatus further includes: an acquiring module 1002 and a receiving module 1003.

The acquiring module 1002 is configured to acquire position information of the first virtual character in the preset game scene.

The determining module 902 is specifically configured to determine that the first virtual character is located within the preset range of the virtual surveillance character in the preset game scene according to the position information.

Optionally, the receiving module 1003 is specifically configured to receive a movement instruction for the first virtual character sent by a first client.

The sending module 903 is specifically configured to determine a target position of the first virtual character in the preset game scene according to the movement instruction, and send position information corresponding to the target position to the first client corresponding to the first virtual character.

The acquiring module 1002 is specifically configured to acquire the position information of the first virtual character after moving according to the target position, in response to receiving a confirmation message sent by the first client.

As shown in FIG. 10, the apparatus further includes: a teleporting module 1004, configured to teleport the second virtual character to the preset game scene in response to receiving a confirmation message for the support notification sent by the second client.

The above apparatus is configured to perform the method provided by the above-mentioned embodiments, and its implementation principles and technical effects are similar, which are not repeated here.

The above modules may be one or more integrated circuits configured to implement the above methods, for example, one or more Application Specific Integrated Circuit (ASIC), or one or more Digital Signal Processor (DSP), or one or more Field Programmable Gate Array (FPGA), etc. For another example, when some of the above modules are implemented by calling program codes by a processing element, the processing element may be a general-purpose processor, such as a Central Processing Unit (CPU) or other processors that can call the program codes. For still another example, these modules can be integrated together and implemented in the form of a System-On-a-Chip (SOC).

Figure 11:
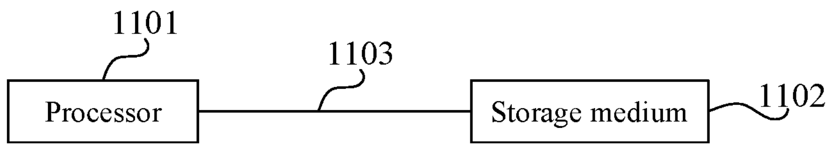
FIG. 11 is a schematic structural diagram of a device for sending a message provided by an embodiment of the present disclosure.

FIG. 11 is a schematic structural diagram of a device for sending a message provided by an embodiment of the present disclosure. The device for sending the message may be integrated in a terminal device or a chip of the terminal device.

The device for sending the message includes: a processor 1101, a storage medium 1102 and a bus 1103.

The storage medium 1102 is configured to store a program, and the processor 1101 calls the program stored in the storage medium 1102 to perform the method embodiments corresponding to FIGS. 1 to 6 above. The specific implementations and technical effects are similar, and details are not repeated here.

Optionally, the present disclosure further provides a program product, such as a storage medium having a computer program stored thereon, including a program, which, when run by a processor, is configured to perform the embodiments corresponding to the above methods.

In several embodiments provided in the present disclosure, it should be understood that the apparatus and method disclosed may be implemented in other manners. For example, the apparatus embodiments described above are only illustrative. For example, the division of units is only a logical function division. In a practice implementation, there may be other divisions. For example, a plurality of units or components can be combined or can be integrated into another system, or some features can be ignored, or not implemented. In addition, mutual coupling or direct coupling or communication connection shown or discussed may be indirect coupling or communication connection through some interfaces, apparatuses or units, and may be in electrical, mechanical or other forms.

The units described as separate components may or may not be physically separated, and components displayed as units may or may not be physical units. That is, the components displayed as units may be located in one place, or may be distributed to a plurality of network units. Some or all of the units may be selected according to actual needs to implement the objectives of the solutions provided in the embodiments.

In addition, individual functional units provided in the respective embodiments of the present disclosure may be integrated into one processing unit, or the individual functional units may exist physically alone, or two or more functional units may be integrated into one unit. The above-mentioned integrated units may be implemented in the form of hardware, or may be implemented in the form of hardware and software functional units.

The above-mentioned integrated functional units implemented in the form of software can be stored in a computer-readable storage medium. The above-mentioned software functional unit is stored in a storage medium, and includes several instructions to cause a computer device (which may be a personal computer, a server, or a network device, etc.) or a processor to perform partial steps of the methods provided in various embodiments of the present disclosure. The aforementioned storage medium includes various mediums that can store program codes, such as a USB flash disk, a mobile hard disk, a Read-Only Memory (ROM), a Random Access Memory (RAM), a magnetic disk or an optical disk, etc.

What is claimed is:

1. A method for triggering a teleporting operation, applied to a first client, wherein the first client is a client corresponding to a first virtual character, a graphical user interface is provided by the first client, and at least part of a preset game scene is displayed by the graphical user interface, and the method comprises:

providing a virtual surveillance character in the preset game scene, wherein the virtual surveillance character is a virtual surveillance character provided in the preset game scene according to a difficulty of the preset game scene or a virtual surveillance character displayed based on a preset operation of a second game faction;

determining that the first virtual character is located within a preset range of the virtual surveillance character in the preset game scene, and generating a message notification instruction, wherein the first virtual character is a virtual character of a first game faction; and sending the message notification instruction to a server, so that a support notification is generated by the server according to the message notification instruction, the support notification is used to provide a teleporting interface to at least one second client that controls a second virtual character, and the teleporting interface is used to trigger an instruction for teleporting the second virtual character to the preset game scene where the first virtual character is located, wherein the method further comprises:

in response to the first virtual character winning a battle against the second virtual character, acquiring a virtual reward in the preset game scene by the first virtual character;

wherein an instance corresponding to the virtual surveillance character comprises a plurality of sub-instances, and after the acquiring the virtual reward in the preset game scene by the first virtual character, the method further comprises:

controlling the first virtual character to enter a scene of a next-level sub-instance of a current sub-instance according to parent-child relationships between individual sub-instances.

2. The method according to claim 1, wherein the determining that the first virtual character is located within the preset range of the virtual surveillance character in the preset game scene comprises:

controlling the first virtual character to move in the preset game scene in response to a movement operation on the first virtual character;

acquiring a position of the first virtual character in the preset game scene during movement of the first virtual character; and determining that the first virtual character is located within the preset range of the virtual surveillance character in the preset game scene according to the position.

3. The method according to claim 1, wherein the providing the virtual surveillance character in the preset game scene comprises:

providing the at least one virtual surveillance character in the preset game scene according to a preset setting rule.

4. The method according to claim 1, wherein the virtual surveillance character is a target virtual surveillance character displayed based on a preset operation of a second game faction.

5. The method according to claim 1, wherein before the determining that the first virtual character is located within the preset range of the virtual surveillance character in the preset game scene, the method further comprises:

controlling the first virtual character to move within the preset game scene in response to a movement operation on the first virtual character.

6. The method according to claim 5, wherein the movement operation is an operation of a player on a movement control in the graphical user interface, or a movement operation of the player on an external device connected to the first client, or a movement operation triggered by a sliding or clicking operation of the player on the graphical user interface.

7. The method according to claim 1, wherein after the sending the message notification instruction to the server, the method further comprises:

acquiring a skill release result according to a preset rule, in response to a skill release operation of the first virtual character within a first preset time; and sending a pause instruction to the server according to the skill release result, wherein the pause instruction is used to pause sending of the support notification.

8. The method according to claim 7, wherein the acquiring the skill release result according to the preset rule in response to the skill release operation of the first virtual character within the first preset time comprises:

acquiring skill release information in response to the skill release operation of the first virtual character within the first preset time, wherein the skill release information comprises at least one of the following: a skill attribute, a release direction, and a release distance; and acquiring the skill release result according to the skill release information and the preset rule.

9. The method according to claim 7, wherein the first preset time is a duration required for transmission of the support notification.

10. The method according to claim 7, wherein after the sending the pause instruction to the server according to the skill release result, the method further comprises:

generating the message notification instruction, in response to determining that the position of the first virtual character is within the preset range of the virtual surveillance character after a second preset time interval; and sending the message notification instruction to the server.

11. The method according to claim 1, wherein the preset range of the virtual surveillance character is a preset range with the virtual surveillance character as a center and a line-of-sight distance of the virtual surveillance character as a radius.

12. The method according to claim 1, wherein the number of second virtual characters has a maximum.

13. The method according to claim 1, wherein the virtual surveillance character is located in a preset game instance scene.

14. A first client, wherein the first client is a client corresponding to a first virtual character, a graphical user interface is provided by the first client, and at least part of a preset game scene is displayed by the graphical user interface, and wherein the first client comprises: a processor, a storage medium configured to store machine-readable instructions executable by the processor, and a bus through which the processor is in communication with the storage medium, and the processor is configured to perform the machine-readable instructions to perform the following operations:

providing a virtual surveillance character in the preset game scene, wherein the virtual surveillance character is a virtual surveillance character provided in the preset game scene according to a difficulty of the preset game scene or a virtual surveillance character displayed based on a preset operation of a second game faction;

determining that the first virtual character is located within a preset range of the virtual surveillance character in the preset game scene, and generating a message notification instruction, wherein the first virtual character is a virtual character of a first game faction; and sending the message notification instruction to a server, so that a support notification is generated by the server according to the message notification instruction, the support notification is used to provide a teleporting interface to at least one second client that controls a second virtual character, and the teleporting interface is used to trigger an instruction for teleporting the second virtual character to the preset game scene where the first virtual character is located, wherein the processor is further configured to:

in response to the first virtual character winning a battle against the second virtual character, acquire a virtual reward in the preset game scene by the first virtual character;

wherein an instance corresponding to the virtual surveillance character comprises a plurality of sub-instances, and after the acquiring the virtual reward in the preset game scene by the first virtual character, the processor is further configured to:

control the first virtual character to enter a scene of a next-level sub-instance of a current sub-instance according to parent-child relationships between individual sub-instances.

* * * * *